(12) United States Patent
Chen et al.

(10) Patent No.: US 11,909,214 B2
(45) Date of Patent: Feb. 20, 2024

(54) TOPOLOGY OF SERIES-CONNECTED MMC WITH A SMALL NUMBER OF MODULES

(71) Applicant: SOUTHEAST UNIVERSITY, Jiangsu (CN)

(72) Inventors: Wu Chen, Jiangsu (CN); Liangcai Shu, Jiangsu (CN); Haozhe Jin, Jiangsu (CN); Xiaokun He, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 176 days.

(21) Appl. No.: 17/640,603

(22) PCT Filed: May 7, 2021

(86) PCT No.: PCT/CN2021/092111
§ 371 (c)(1),
(2) Date: Mar. 4, 2022

(87) PCT Pub. No.: WO2022/188255
PCT Pub. Date: Sep. 15, 2022

(65) Prior Publication Data
US 2023/0017288 A1    Jan. 19, 2023

(30) Foreign Application Priority Data

Mar. 8, 2021 (CN) .......................... 202110251640.X

(51) Int. Cl.
*H02J 3/38* (2006.01)
*H02M 1/00* (2006.01)
(Continued)

(52) U.S. Cl.
CPC ............. *H02J 3/38* (2013.01); *H02M 1/0074* (2021.05); *H02M 7/487* (2013.01); *H02M 7/4835* (2021.05)

(58) Field of Classification Search
CPC ...... H02J 3/38; H02M 1/0074; H02M 7/4835; H02M 7/487
See application file for complete search history.

(56) References Cited

U.S. PATENT DOCUMENTS

| | | | |
|---|---|---|---|
| 10,256,745 B2* | 4/2019 | Nami | H02M 1/32 |
| 11,133,752 B2* | 9/2021 | Zhang | H02M 3/158 |
| 11,641,154 B2* | 5/2023 | Halfmann | H02M 7/7575 |
| | | | 323/282 |

FOREIGN PATENT DOCUMENTS

| | | |
|---|---|---|
| CN | 105305843 A | 2/2016 |
| CN | 112271746 A | 1/2021 |

(Continued)

OTHER PUBLICATIONS

Heya Yang, "Topology Derivation and Control Strategy of Modular Multilevel Converters,", Zhejiang University, Thesis, Jan. 3, 2020, 136 pages.

*Primary Examiner* — Adolf D Berhane
(74) *Attorney, Agent, or Firm* — MUNCY, GEISSLER, OLDS & LOWE, P.C.

(57) ABSTRACT

The present disclosure relates to the field of electric power system, and more particularly to a topology of a series-connected MMC with a small number of modules, where the topology is composed of a three-phase bridge circuit, half-bridge valve strings, a three-phase filter inductor, and a three-phase grid frequency transformer. The topology of a series-connected MMC with a small number of modules in the present disclosure needs only two half-bridge valve strings, thus greatly reducing the number of the submodules as compared with the conventional MMC structure. When achieving the same high DC voltage output, the present disclosure can improve the power density of the MMC, realize stable three-phase AC output voltage, and further achieve balance of capacitor voltages in the two half-bridge (Continued)

valve strings. Compared to the conventional MMC topology, the topology in the present disclosure can reduce the number of submodules by nearly ⅔, and has a greater AC-DC voltage transfer ratio, thus reducing the cost of the MMC converter, reducing the device size, and improving the power density.

8 Claims, 4 Drawing Sheets

(51) Int. Cl.
*H02M 7/483* (2007.01)
*H02M 7/487* (2007.01)

(56) References Cited

FOREIGN PATENT DOCUMENTS

| EP | 3223419 A1 | 9/2017 | |
|----|------------|--------|---|
| WO | WO-2016101985 A1 * | 6/2016 | ................ H02J 3/36 |

* cited by examiner

TOPOLOGY OF SERIES-CONNECTED MMC WITH A SMALL NUMBER OF MODULES

TECHNICAL FIELD

The present disclosure relates to the field of electric power system, and more particularly to a topology of a series-connected MMC with a small number of modules.

BACKGROUND

In recent years, MMC converters have been widely used in high-voltage DC transmission, AC-DC grid interconnection, and other scenarios, which can realize interconnection and energy exchange between medium and low-voltage DC and medium and high-voltage AC grids. However, with the constant improvement of voltage level, limited by the withstand voltage level of current commercial semiconductor devices, the existing MMC topology can only support the AC/DC bus voltage by increasing the number of submodules, resulting in increased cost and size, significantly reduced power density, and decreased reliability of the MMC system. Therefore, how to reduce the number of MMC modules, reduce the size of the device, and increase the power density by changing the topology of the MMC converter without adding the withstand voltage requirements for switching devices and DC energy storage capacitors is a problem in urgent need to be solved at present.

SUMMARY

In order to overcome the shortcomings in the prior technology, the present disclosure aims to provide a topology of a series-connected MMC with a small number of modules, which can solve the problem that the MMC has a huge number of modules, large volume, and low power density.

The objective of the present disclosure can be achieved by using the following technical solutions:

A topology of a series-connected MMC converter with a small number of modules is provided, which is composed of a three-phase bridge circuit, half-bridge valve strings, a three-phase filter inductor, and a three-phase grid frequency transformer;

the three-phase bridge circuit is formed by series connection of a phase-A bridge circuit, a phase-B bridge circuit, and a phase-C bridge circuit, any of which is formed by combination of a high-voltage DC capacitor, a first high-voltage switch string, and a second high-voltage switch string; and the first high-voltage switch string and the second high-voltage switch string are connected in series and then connected in parallel to the high-voltage DC capacitor;

the half-bridge valve string is formed by series connection of a set of half-bridge submodules, full-bridge submodules, or half-bridge/full-bridge hybrid submodules; and the other terminals of the three-phase filter inductor are respectively connected to primary winding terminals of the three-phase grid frequency transformer, and secondary winding terminals of the three-phase grid frequency transformer form a high-voltage AC port; and a connection type of the three-phase grid frequency transformer is one of Y/Y, Δ/Y, Δ/Δ, and Y/Δ structures.

Further, the bridge circuit of any phase is a three-level structure.

Further, the lower terminal of the first high-voltage switch string and the upper terminal of the second high-voltage switch string together form an AC output midpoint of a bridge circuit of the corresponding phase; and the capacitor positive terminal of the phase-A bridge circuit and the capacitor negative terminal of the phase-C bridge circuit form a high-voltage DC port.

Further, the high-voltage switch string in the bridge circuit of each phase is composed of a set of series-connected semiconductor switches or a set of series-connected half-bridge modules, where any half-bridge module consists of two semiconductor switches and one equalizing capacitor.

Further, the AC output midpoint of the phase-A bridge circuit is connected to the positive terminal of a half-bridge valve string 1, and the negative terminal of the half-bridge valve string 1 is connected to the phase-A filter inductor;

the AC output midpoint of the phase-C bridge circuit is connected to the negative terminal of a half-bridge valve string 2, and the positive terminal of the half-bridge valve string 2 is connected to the phase-C filter inductor; and the AC output midpoint of the phase-B bridge circuit is directly connected to the phase-B filter inductor.

Further, switches in the three-phase bridge circuit are all controlled with duty ratio of 50%, and drive signals of first and second switches in the bridge circuit of each phase are opposite.

Further, in the phase-A bridge circuit, a first switch drive signal vSA1 and a phase-A modulation wave vA are identical in phase;

in the phase-B bridge circuit, a first switch drive signal vSB1 and a phase-B modulation wave vB are in-phase; and in the phase-C bridge circuit, a first switch drive signal vSC1 and a phase-C modulation wave vC are in-phase.

Further, a modulation wave signal of the first half-bridge valve string 1 connected to the midpoint of the phase-A bridge circuit is (vSA1−vSB1)×(⅔×VM)/(N×VSM)−(vA−vB), where VM is the voltage across the high-voltage DC port, N is the number of submodules in a half-bridge valve string, and VSM is the capacitor voltage of the submodules in the half-bridge valve string; and a modulation wave signal of the second half-bridge valve string 2 connected to the midpoint of the phase-C bridge circuit is (vSB1−vSC1)×(⅔×VM)/(N×VSM)−(vB−vC), where three-phase modulation waves vA, vB, vC can be obtained by closed-loop control on the capacitor voltages of the valve strings or control over the AC-side voltages or currents.

The present disclosure has the following beneficial effects:

1. The topology of a series-connected MMC converter with a small number of modules in the present disclosure needs only two half-bridge valve strings, thus greatly reducing the number of the submodules as compared with the conventional MMC structure. When achieving the same high DC voltage output, the present disclosure can improve the power density of the MMC converter, realize stable three-phase AC output voltage, and further achieve balance of capacitor voltages in two half-bridge submodules.

2. Compared to the conventional MMC, the topology in present disclosure can reduce the number of submodules by nearly ⅔, and has a greater AC-DC voltage transfer ratio, thus reducing the cost of the MMC, reducing the device size, and improving the power density.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The technical solutions in the embodiments of the present disclosure will be clearly and completely described below with reference to the accompanying drawings in the embodiments of the present disclosure. Apparently, the described embodiments are some rather than all the embodiments of the present disclosure. Based on the embodiments of the present disclosure, other embodiments acquired by those of ordinary skill in the art without creative effort all belong to the protection scope of the present disclosure.

Figure 1:
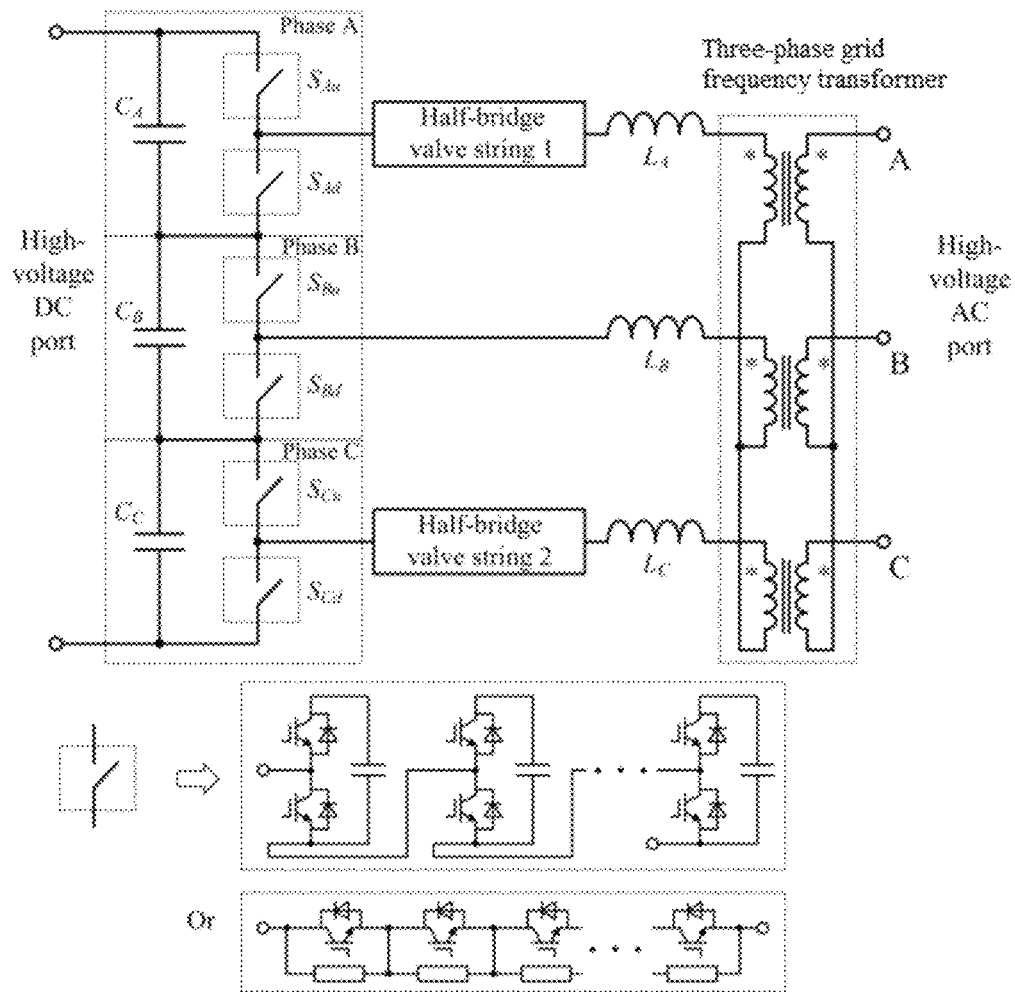
FIG. 1 is a schematic diagram of a topology of a series-connected MMC converter with a small number of modules in the present disclosure.
Figure 2:
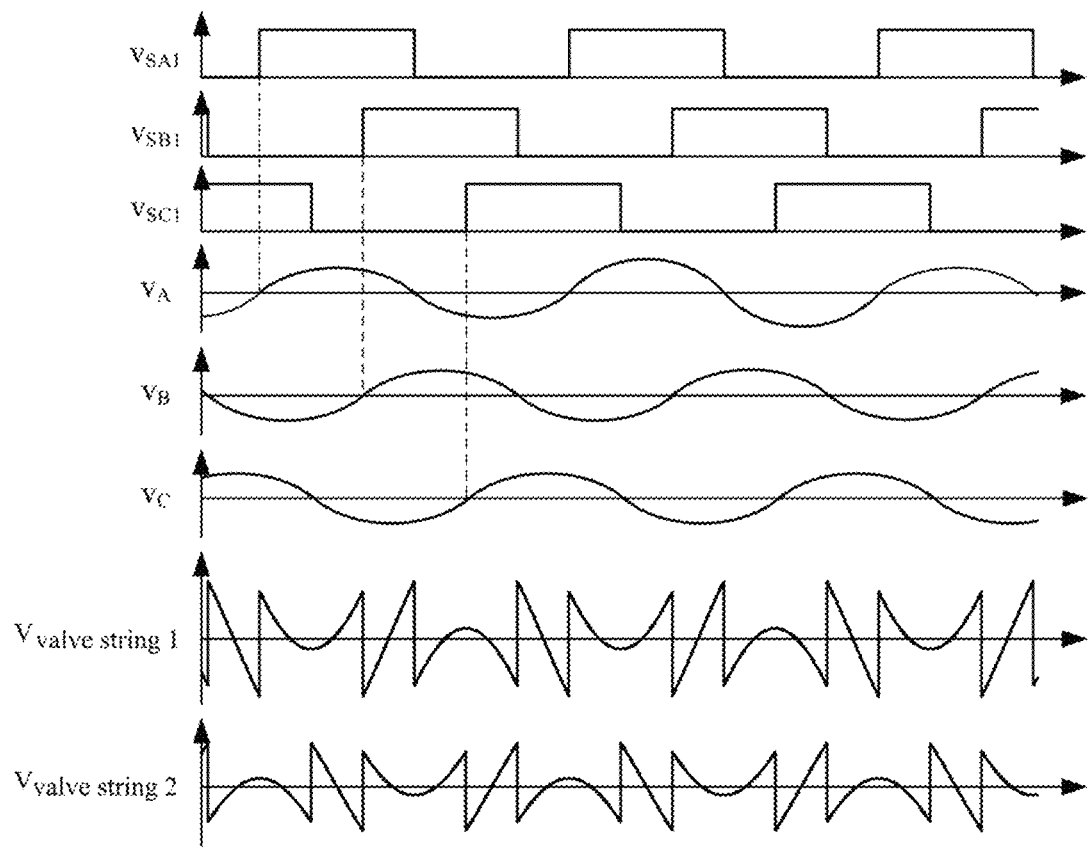
FIG. 2 is a schematic diagram of high-voltage switch string driving waveforms and half-bridge valve string modulation waveforms of the series-connected MMC converter with a small number of modules in the present disclosure.

A topology of a series-connected MMC converter with a small number of modules, as shown in FIG. 1, is composed of a three-phase bridge circuit, half-bridge valve strings, a three-phase filter inductor, and a three-phase grid frequency transformer.

The three-phase bridge circuit is formed by series connection of a phase-A bridge circuit, a phase-B bridge circuit, and a phase-C bridge circuit, any of which is formed by combination of a high-voltage DC capacitor, a first high-voltage switch string, and a second high-voltage switch string. The first high-voltage switch string and the second high-voltage switch string are connected in series and then connected in parallel to the high-voltage DC capacitor. The lower terminal of the first high-voltage switch string and the upper terminal of the second high-voltage switch string together form an AC output midpoint of a bridge circuit of the corresponding phase; and the capacitor positive terminal of the phase-A bridge circuit and the capacitor negative terminal of the phase-C bridge circuit form a high-voltage DC port.

The high-voltage switch string in the bridge circuit of each phase may be composed of a set of series-connected semiconductor switches or a set of series-connected half-bridge modules, where any half-bridge module consists of two semiconductor switches and one equalizing capacitor with a small capacitance.

The half-bridge valve string is formed by series connection of a set of half-bridge submodules, full-bridge submodules, or half-bridge/full-bridge hybrid submodules.

The AC output midpoint of the phase-A bridge circuit is connected to the positive terminal of a half-bridge valve string 1, and the negative terminal of the half-bridge valve string 1 is connected to the phase-A filter inductor.

The AC output midpoint of the phase-C bridge circuit is connected to the negative terminal of a half-bridge valve string 2, and the positive terminal of the half-bridge valve string 2 is connected to the phase-C filter inductor.

The AC output midpoint of the phase-B bridge circuit is directly connected to the phase-B filter inductor.

The other terminals of the three-phase filter inductor are respectively connected to primary winding terminals of the three-phase grid frequency transformer, and secondary winding terminals of the three-phase grid frequency transformer form a high-voltage AC port. A connection manner of the three-phase grid frequency transformer may be one of Y/Y, Δ/Y, Δ/Δ, and Y/Δ.

In a basic control method of the topology of a series-connected MMC converter with a small number of modules, switches in the three-phase bridge circuit are all controlled at a duty ratio of 50%, and first and second switch drive signals in the bridge circuit of each phase are opposite.

In the phase-A bridge circuit, a first switch drive signal vSA1 and a phase-A modulation wave vA are identical in phase; in the phase-B bridge circuit, a first switch drive signal vSB1 and a phase-B modulation wave vB are identical in phase; and in the phase-C bridge circuit, a first switch drive signal vSC1 and a phase-C modulation wave vC are identical in phase.

A modulation wave signal of the first half-bridge valve string 1 connected to the midpoint of the phase-A bridge circuit is $(vSA1-vSB1) \times (\frac{2}{3} \times VM)/(N \times VSM) - (vA-vB)$, where VM is the voltage at the high-voltage DC port, N is the number of submodules in a half-bridge valve string, and VSM is the capacitor voltage of the submodules in the half-bridge valve string.

A modulation wave signal of the second half-bridge valve string 2 connected to the midpoint of the phase-C bridge circuit is $(vSB1-vSC1) \times (\frac{2}{3} \times VM)/(N \times VSM) - (vB-vC)$, where modulation waves vA, vB, vC of three phases can be obtained by closed loop control on the capacitor voltage of the valve string submodules or control over the AC-side voltage or current.

Figure 3:
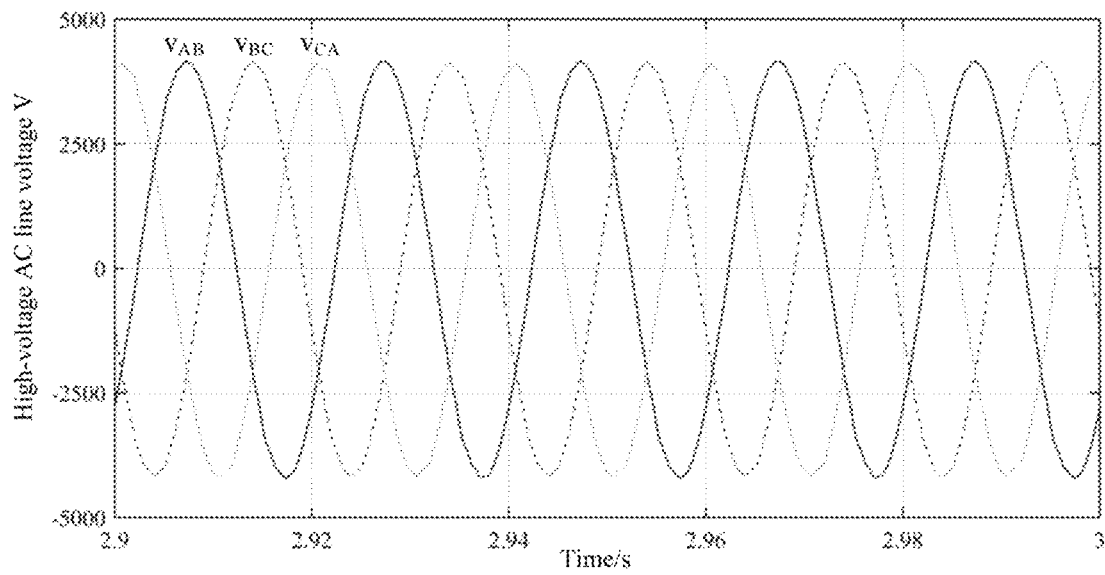
FIG. 3 is a schematic diagram of working waveforms of a high-voltage AC port in an inversion state of the series-connected MMC converter with a small number of modules in the present disclosure.

FIG. 3 shows operation waveforms of the high-voltage AC port of the series-connected MMC with a small number of modules. As shown in FIG. 3, with the aforementioned control method, stable three-phase AC port voltage can be realized.

Figure 4:
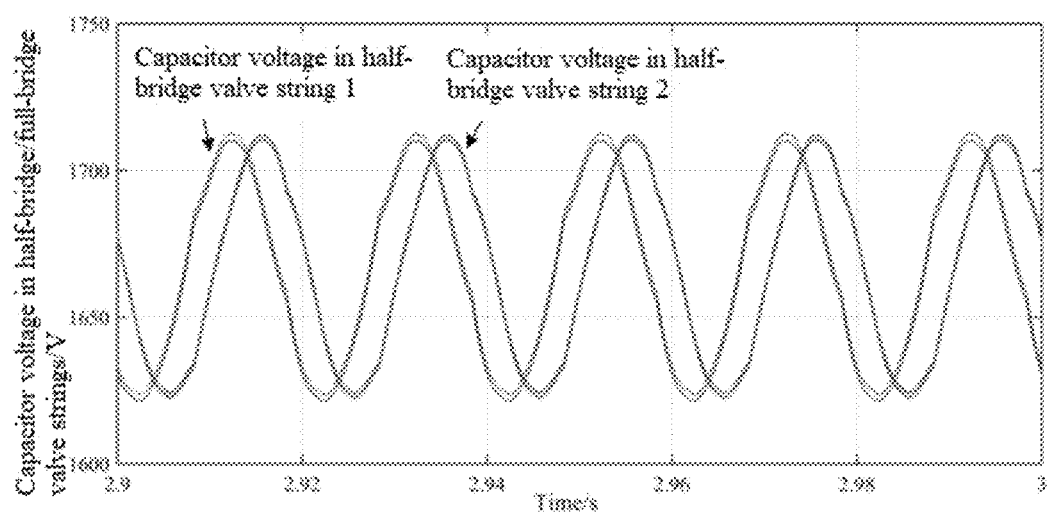
FIG. 4 is a schematic diagram of three-phase submodule voltage working waveforms in an inversion state of the series-connected MMC converter with a small number of modules in the present disclosure.

FIG. 4 shows working waveforms of submodule capacitor voltages in the half-bridge valve strings of the series-connected MMC with a small number of modules. As shown in FIG. 4, capacitor voltages in two half-bridge valve strings can be balanced.

Figure 5:
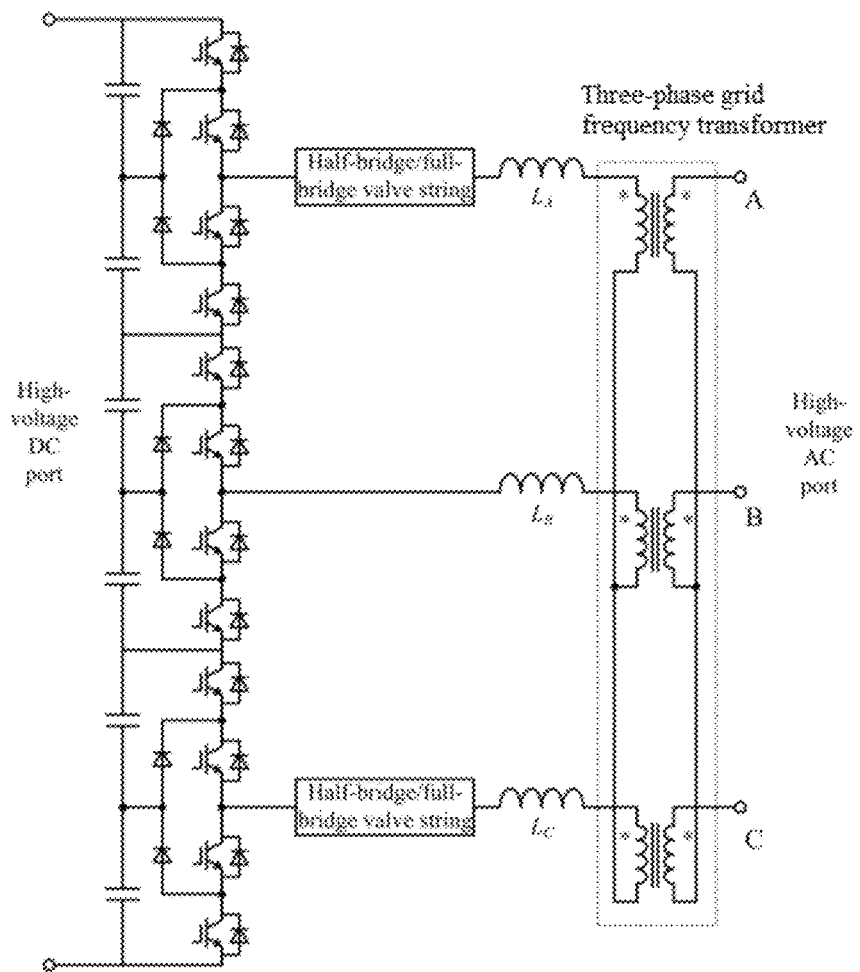
FIG. 5 is a schematic topology diagram of another three-level series-connected MMC converter with a small number of modules in the present disclosure.

FIG. 5 shows a topology of another three-level series-connected MMC converter, where the three-phase bridge circuit at the side of a high-voltage DC port is a three-level structure, and switching devices with a relatively low withstand voltage may be used to support the high-voltage port.

Compared to the conventional MMC topology, the topology provided by the present disclosure can reduce the number of submodules by nearly ⅔, and has a greater AC-DC voltage transfer ratio, thus reducing the cost of the MMC converter, reducing the device size, and improving the power density.

The above shows and describes the basic principles, main features, and advantages of the present disclosure. Those skilled in the art should understand that the present disclosure is not limited by the foregoing embodiments, and the foregoing description in the embodiments and the specification are merely for explaining the principle of the present disclosure. Various changes and improvements may be made to the present disclosure without departing from the spirit and scope of the present disclosure, and these changes and improvements all fall within the protection scope of the present disclosure.

What is claimed is:

1. A topology of a series-connected MMC converter with a small number of modules, wherein the topology is composed of a three-phase bridge circuit, half-bridge valve strings, a three-phase filter inductor, and a three-phase grid frequency transformer;

the three-phase bridge circuit is formed by series connection of a phase-A bridge circuit, a phase-B bridge circuit, and a phase-C bridge circuit, any of which is formed by combination of a high-voltage DC capacitor, a first high-voltage switch string, and a second high-voltage switch string;

and the first high-voltage switch string and the second high-voltage switch string are connected in series and then connected in parallel to the high-voltage DC capacitor;

the half-bridge valve string is formed by series connection of a set of half-bridge submodules, full-bridge submodules, or half-bridge/full-bridge hybrid submodules; and the other terminals of the three-phase filter inductor are respectively connected to primary winding terminals of the three-phase grid frequency transformer, and secondary winding terminals of the three-phase grid frequency transformer form a high-voltage AC port; and a connection manner of the three-phase grid frequency transformer is one of Y/Y, Δ/Y, Δ/Δ, and Y/Δ structures.

2. The topology of a series-connected MMC converter with a small number of modules according to claim 1, wherein the bridge circuit of any phase is a three-level structure.

3. The topology of a series-connected MMC converter with a small number of modules according to claim 1, wherein the lower terminal of the first high-voltage switch string and the upper terminal of the second high-voltage switch string together form an AC output midpoint of a bridge circuit of the corresponding phase; and the capacitor positive terminal of the phase-A bridge circuit and the capacitor negative terminal of the phase-C bridge circuit form a high-voltage DC port.

4. The topology of a series-connected MMC converter with a small number of modules according to claim 1, wherein the high-voltage switch string in the bridge circuit of each phase is composed of a set of series-connected semiconductor switches or a set of series-connected half-bridge modules, wherein any half-bridge module consists of two semiconductor switches and one equalizing capacitor.

5. The topology of a series-connected MMC converter with a small number of modules according to claim 1, wherein the AC output midpoint of the phase-A bridge circuit is connected to the positive terminal of a half-bridge valve string 1, and the negative terminal of the half-bridge valve string 1 is connected to the phase-A filter inductor;

the AC output midpoint of the phase-C bridge circuit is connected to the negative terminal of a half-bridge valve string 2, and the positive terminal of the half-bridge valve string 2 is connected to the phase-C filter inductor; and the AC output midpoint of the phase-B bridge circuit is directly connected to the phase-B filter inductor.

6. The topology of a series-connected MMC converter with a small number of modules according to claim 1, wherein switches in the three-phase bridge circuit are all controlled with duty ratio of 50%, and drive signals of first and second switches in the bridge circuit of each phase are opposite.

7. The topology of a series-connected MMC converter with a small number of modules according to claim 1, wherein in the phase-A bridge circuit, a first switch drive signal vSA1 and a phase-A modulation wave vA are identical in phase;

in the phase-B bridge circuit, a first switch drive signal vSB1 and a phase-B modulation wave vB are identical in phase; and in the phase-C bridge circuit, a first switch drive signal vSC1 and a phase-C modulation wave vC are identical in phase.

8. The topology of a series-connected MMC converter with a small number of modules according to claim 7, wherein a modulation wave signal of the first half-bridge valve string 1 connected to the midpoint of the phase-A bridge circuit is (vSA1−vSB1)×(⅔×VM)/(N×VSM)−(vA−vB), VM being the voltage across the high-voltage DC port, N being the number of submodules in a half-bridge valve string, and VSM being the capacitor voltage of the submodules in the half-bridge valve string; and a modulation wave signal of the second half-bridge valve string 2 connected to the midpoint of the phase-C bridge circuit is (vSB1−vSC1)×(⅔×VM)/(N×VSM)−(vB−vC), where three-phase modulation waves vA, vB, vC can be obtained by closed-loop control on the capacitor voltage of the valve strings or control over the AC-side voltages or currents.

* * * * *